United States Patent [19]

Hayashi et al.

[11] 4,277,383

[45] Jul. 7, 1981

[54] AQUEOUS CATIONIC THERMOSETTING URETHANE RESIN COATING COMPOSITIONS

[75] Inventors: Masaaki Hayashi, Tokyo; Koichi Nagami, Musashino; Kazuyoshi Tsuneta, Yokohama; Nobuhiro Kenmotusu, Fujisawa, all of Japan

[73] Assignee: Dai Nippon Toryo Co., Ltd, Osaka, Japan

[21] Appl. No.: 120,050

[22] Filed: Feb. 11, 1980

[30] Foreign Application Priority Data

Feb. 15, 1979 [JP] Japan .................................. 54-16441
Mar. 9, 1979 [JP] Japan .................................. 54-27470

[51] Int. Cl.$^3$ ..................... C08L 61/10; C08L 75/12
[52] U.S. Cl. .............................. 260/29.3; 204/181 C;
260/29.2 TN; 525/456

[58] Field of Search ...................... 260/29.3, 29.2 TN;
525/456; 204/181 C

[56] References Cited

U.S. PATENT DOCUMENTS

| | | | |
|---|---|---|---|
| 3,384,606 | 5/1968 | Dieterich et al. | 260/29.3 |
| 3,479,310 | 11/1969 | Dieterich et al. | 525/456 |
| 3,652,477 | 3/1972 | Anderson et al. | 260/29.3 |
| 4,147,679 | 4/1979 | Scriven et al. | 260/29.2 TN |

*Primary Examiner*—Theodore E. Pertilla
*Attorney, Agent, or Firm*—Bucknam and Archer

[57] ABSTRACT

The present invention relates to an aqueous thermosetting coating composition comprising (A) a cationic thermosetting urethane resin, (B) a water-insoluble resol-type phenolic resin, (C) an acid as a neutralizing agent and (D) water as a diluent.

7 Claims, No Drawings

AQUEOUS CATIONIC THERMOSETTING URETHANE RESIN COATING COMPOSITIONS

BACKGROUND OF THE INVENTION

From the viewpoints of conserving resources and preventing environmental pollution, solvent type paints have gradually been replaced by pollution-free paints, particularly aqueous paints, and it is expected that this tendency will advance further in the future. An electrodeposition paint proposed as one of such aqueous paints has been used widely as an undercoating paint for automobiles because this paint is excellent in terms of reducing labor, reducing coating expenses and preventing environmental pollution. However, the corrosion resistance of coatings formed from anionic electrodeposition paints now available is not satisfactory. For this anionic electrodeposition paint, a polycarboxylic acid resin comprising a drying oil, an alkyd resin, a polybutadiene resin, an epoxy ester resin or an acrylic resin is used as the resin component. This resin is ordinarily neutralized by a basic compound such as an organic amine to render the resin water-soluble or water-dispersible. One of the reasons for this poor corrosion resistance of a coating of such an anionic electrodeposition paint is considered to be the presence of carboxyl groups in the cured coating. Recently, a cationic electrodeposition paint has attracted attention as a paint for eliminating the defect of the insufficient corrosion resistance involved in the anionic electrodeposition paint. A polyamino resin comprising an epoxy resin, a urethane resin, an acrylic resin, a polybutadiene resin or an alkyd resin is used as the resin component of this cationic electrodeposition paint. This resin is ordinarily neutralized by an organic acid to render the resin water-soluble or water-dispersible. It is said that a coating having a high corrosion resistance can be obtained with such polyamino resins since amino groups in the coating act as the corrosion-inhibiting agent.

Corrosion of coatings formed on automobiles, to which the above-mentioned conventional electrodeposition paints are mainly applied, is roughly divided into the following two types:

(1) So-called scab corrosion which advances from a portion of the coating damaged by an external cause (for example, impact by a stone or the like).

(2) So-called perforation which advances from unsatisfactorily chemically treated portion or an incompletely coated portion.

Ordinarily, a coating of a cationic electrodeposition paint exhibits effective anti-corrosive action even on an insufficiently chemically treated steel plate. However, susceptibility to damage (1) by an external cause greatly differs depending on the kind of resin. Among the above-mentioned resins having amino groups, a coating of the urethane resin type exhibits excellent properties as flexibility, nearly complete freedom from damage by external causes and, ordinarily, superiority over coatings of other resins with respect to the balance among other properties. Such cationic urethane resins are disclosed, for example, in Japanese Patent Publications No. 36958/73, No. 17234/75, No. 24982/75, No. 2491/76, No. 38317/78, No. 2894/78 and No. 2895/78 and Japanese Patent Application Laid-Open Specifications No. 96696/73, No. 99297/73 and No. 101430/73. However, these cationic urethane resins are still defective in coating properties such as corrosion resistance and water resistance.

Furthermore, it is known to incorporate a phenolic resin in an epoxy resin type or acrylic resin type cationic coating composition. For example, there are known (1) a composition comprising a polyepoxide solubilized by a quaternary onium salt and an amine/aldehyde condensate and/or unsaturated methylol phenyl ether (see the specifications of U.S. Pat. Nos. 3,937,679 and 4,038,166), (2) an aqueous lacquer comprising an addition polymer, or a polycondensation polymer, for example a nitrogen-containing basic resin of the acrylic or epoxy ester type, and if desired, an aminoplast and/or phenolplast, in which the phenolplast is partially or completely etherified by a lower alcohol (see Japanese Patent Publication No. 770/77), (3) a composition comprising an acrylic resin and, if desired, a water-soluble phenol-formaldehyde resin (see the specifications of U.S. Pat. Nos. 3,446,723, 3,455,806 and 3,454,482), (4) a coating composition comprising an epoxy resin and, if desired, an amino resin or phenolic resin etherified by an alcohol (see the specification of British Pat. No. 1,307,585), and (5) a composition comprising an epoxy resin, an epoxy ester resin or a reaction product of an epoxy resin or epoxy ester resin with trishydroxylmethylphenol allyl ether or the like (see Japanese Patent Application Laid-Open Specification No. 134897/78).

Furthermore, there is known a composition comprising a cationic water-dispersible resin, a hydrocarbon resin and/or modified hydrocarbon resin and, if desired, an amine-formaldehyde resin or a phenol-formaldehyde resin, for example, a composition comprising an acrylic, epoxy or urethane type cationic water-dispersible resin and a polydiene type hydrocarbon resin (see West German Patent Application Laid-Open Specification No. 2,636,797).

In these known compositions, the epoxy resin is defective in that the flexibility of the coating is insufficient and in that a decline in corrosion resistance is observed after performing impact resistance tests, while the acrylic resin or epoxy ester resin is defective in that the corrosion resistance and water resistance are insufficient. Furthermore, a composition comprising a water-soluble phenolic resin in combination with the resin having amino groups is similarly insufficient in corrosion resistance and water resistance, and a composition comprising an etherified phenolic resin incorporated in or bonded to the resin is defective in that properties of a coating cured at a low temperature (lower than 180° C.) are insufficient and the corrosion resistance and water resistance are poor. In a composition comprising a polybutadiene resin and a phenolic resin in combination with the resin having amino groups, the phenolic resin acts as an anti-oxidant while the polybutadiene resin is an oxidative polymerization type resin. Hence, this composition is defective in that a satisfactory cured coating cannot be obtained.

We have conducted research with a view to developing a coating composition comprising a urethane resin in which the corrosion resistance and water resistance are highly improved while retaining excellent properties inherent to a coating of the urethane resin type, such as high flexibility. We have now completed the present invention based on the results of this research.

More specifically, we have found that when a water-insoluble resol-type phenolic resin is used in combination with a urethane resin, the corrosion resistance and water resistance of the resulting coating can be remarkably improved without diminishing the physical properties of the coating, such as the flexibility, while improving the appearance of the coating (occurrence of popping is prevented) and attaining good low-temperature curability. The present invention has been perfected based on this finding.

SUMMARY OF THE INVENTION

The present invention relates to an aqueous thermosetting coating composition. More particularly, the present invention relates to an aqueous thermosetting coating composition which provides a coating excellent in physical properties, corrosion resistance and water resistance.

The aqueous thermosetting coating composition according to the present invention comprises (A) a cationic thermosetting urethane resin, (B) a water-insoluble resol type phenolic resin, (C) an acid as a neutralizing agent and (D) water as a diluent.

DETAILED DESCRIPTION OF THE PREFERRED EMBODIMENTS

The present invention relates to an aqueous thermosetting resin coating composition. More particularly, the present invention relates to an aqueous thermosetting resin coating composition comprising a cationic thermosetting urethane resin rendered water-soluble or water-dispersible by neutralization with an acid (component A) and a water-insoluble resol type phenolic resin (component B), which provides a coating excellent in physical properties, corrosion resistance and water resistance.

The cationic thermosetting urethane resin (component A) that is used in the present invention is a urethane resin having a tertiary amino group, a blocked isocyanate group and an active hydrogen atom in the molecule. For example, use may be made of cationic thermosetting urethane resins disclosed in Japanese Patent Publications No. 17234/75, No. 2491/76, No. 38317/78, No. 2894/78 and No. 2895/78 and Japanese Patent Application Laid-Open Specifications No. 96696/73, No. 99297/73 and No. 101430/73.

These resins are ordinarily obtained by reaction between hydroxyl groups in a reaction product of a polyurethane prepolymer having a terminal isocyanate group with an amine having at least 2 hydroxyl groups in the molecule [hereinafter referred to as "reaction product (a)"] and isocyanate groups in a reaction product of an organic diisocyanate with a monofunctional blocking agent [hereinafter referred to as "reaction product (b)"].

The polyurethane prepolymer having a terminal isocyanate group may be synthesized by reacting a polyisocyanate with a polyol at such a reaction ratio that at least 1 equivalent, preferably about 1.5 to about 2.0 equivalents, of the polyisocyanate is reacted with 1 equivalent of the polyol.

As the polyisocyanate, use is preferably made of aromatic and aliphatic polyisocyanates having 2 isocyanate groups in the molecule, such as phenylene diisocyanate, tolylene diisocyanate, naphthylene diisocyanate, diphenylmethane diisocyanate, isophorone diisocyanate, lysine diisocyanate, trimethylhexamethylene diisocyanate, hexamethylene diisocyanate, tetramethylene diisocyanate, propylene diisocyanate and ethylene diisocyanate, and hydrogenation products of the above-mentioned aromatic diisocyanates.

As the polyol, use is preferably made of glycols, polyethers and polyesters having 2 hydroxyl groups in the molecule. As specific examples, there can be mentioned glycols such as ethylene glycol, propylene glycol, butylene glycol and neopentyl glycol, polyethers composed of homopolymers or copolymers of tetrahydrofuran, ethylene oxide and propylene oxide, and polyesters synthesized from polyhydric alcohols and polybasic carboxylic acids according to known methods.

It is preferred that the synthesis of the polyurethane prepolymer be carried out in a solvent. As the solvent, use is preferably made of solvents which are inactive to isocyanate groups and have a high affinity to water, such as acetone, methylethyl ketone, acetonitrile, dioxane, dimethylformamide and acetic acid esters. The synthesis reaction is carried out at a temperature of 40° to 120° C. for 1 to 10 hours. The solvent is used in an amount 0.3 to 2 times the total amount of the starting compounds used for the synthesis of the polyurethane prepolymer.

Then, the so-formed polyurethane prepolymer having a terminal isocyanate group is subjected to addition reaction with a tertiary amine having at least 2 hydroxyl groups in the molecule.

The tertiary amine is used in such an amount that at least one hydroxyl group, preferably at least two hydroxyl groups, of the tertiary amine is present per isocyanate group of the polyurethane prepolymer.

As the tertiary amine, use may be made of methyldiethanol amine, triethanol amine, tris-(2-hydroxypropyl) amine, an adduct of 1 mole of ethylene diamine and 4 moles of propylene oxide, and quaternization products of these amines.

The reaction for the synthesis of the reaction product (a) is carried out at 40° to 120° C. for 1 to 10 hours. A solvent is used in an amount 0.3 to 2 times the total amount of the starting compounds used for the synthesis of the reaction product (a).

The reaction product (a) can be obtained according to the above-mentioned procedures.

The reaction product (b) can be obtained by equimolar addition reaction with an organic diisocyanate and a monofunctional blocking agent. For example, the two reactants are reacted with each other at a molar ratio of 1:1 at a temperature of 40° to 110° C. in a solvent for 1 to 10 hours.

As the organic polyisocyanate that is used for the synthesis of the reaction product (b), the same diisocyanates as mentioned above with respect to the synthesis of the polyurethane polyol may be used. As the monofunctional blocking agent, use can be made of blocking agents customarily used for the synthesis of blocked isocyanates, such as phenols, alcohols, lactams, oximes, acid amides, imides, amines, imidazoles, urea derivatives, carbamic acid salts, mercaptans and sulfurous acid salts.

The foregoing solvents to be used for the synthesis of the polyurethane prepolymer may be used for the above-mentioned addition reaction in amounts similar to those mentioned above.

In the addition reaction, the formation of a di-blocked product of the organic diisocyanate is undesirable. This di-blocked product forms insoluble solids when the urethane resin is rendered water-soluble and causes the electrodeposition characteristics of the resulting coating composition to change with the lapse of time. Accordingly, reaction conditions should be determined so that formation of the di-blocked product is prevented to as great an extent as possible.

The cationic thermosetting urethane resin of the present invention can be obtained by reacting the isocyanate groups in the so-obtained addition reaction product (b) with the hydroxyl groups in the above-mentioned reaction product (a).

It is preferred that the mixing ratio of the component (a) and component (b) be arranged so that 20 to 80% of the hydroxyl groups present in the reaction product (a) react with the isocyanate groups present in the addition reaction product (b).

This reaction is carried out at a temperature of 40° to 110° C. for 1 to 10 hours.

The so-obtained cationic thermosetting urethane resin may be used after it has been mixed or partially reacted with a known cationic epoxy, acrylic or alkyd resin. Such resin is used in an amount of about up to 50 parts by weight per 100 parts by weight of the cationic thermosetting urethane resin as solids. Furthermore, the cationic thermosetting urethane resin may be mixed with a water-miscible solvent active to isocyanate groups or be solvent-substituted according to need.

The water-insoluble resol type phenolic resin (component BI) that is used in the present invention is a thermosetting resin synthesized from an aldehyde and a phenol. A water-insoluble resol type phenolic resin obtained in the presence of an alkaline catalyst is especially preferred.

From the viewpoints of the water resistance, corrosion resistance and solvent resistance of the resulting coating, it is preferred that a phenol having a functionality of at least 3 be used as the phenol, but a bifunctional phenol may be used in combination with such phenol. As the phenol having a functionality of at least 3, there can be mentioned, for example, carbolic acid, m-cresol, resorcine, m-methoxyphenol, m-ethoxyphenol and bisphenol A.

As the bifunctional phenol, there can be mentioned, for example, p-cresol, o-cresol, p-methoxyphenol, p-ethoxyphenol, p-t-butylphenol and p-nonylphenol.

The above-mentioned phenols having a functionality of at least 3 may be used singly for the formation of the resol type phenolic resin, or as mixtures of two or more of the phenols having a functionality of at least 3 or as mixtures of such phenols having a functionality of at least 3 with bifunctional phenols.

As the aldehyde that is used for the synthesis of the phenolic resin in the present invention, there can be mentioned, for example, formaldehyde (in the form of an aqueous solution, an organic solvent solution or a solution in a mixed solvent of water and an organic solvent), paraformaldehyde, furfural and acetaldehyde.

As the alkaline catalyst, there can be mentioned, for example, ammonia, primary amines such as methylamine and ethylamine, secondary amines such as dimethylamine and diethylamine, tertiary amines such as trimethylamine and triethylamine, pyridine and pyridine derivatives, and metal hydroxides such as sodium hydroxide, potassium hydroxide, calcium hydroxide and magnesium hydroxide.

In the present invention, it is preferred that ammonia, a primary amine or a secondary amine be used as the catalyst. The amino group of such catalyst participates in the reaction between a phenol and an aldehyde, and a cationic phonolic resin is formed in which the nitrogen atom is introduced in the resulting water-insoluble resol type phenolic resin. Therefore, the water dispersibility, dispersion stability, electrodeposition characteristics and compatibility with the cationic thermosetting urethane resin can be improved.

For example, when ammonia is used as the catalyst, a condensate having the following structure (1) or (2) is obtained:

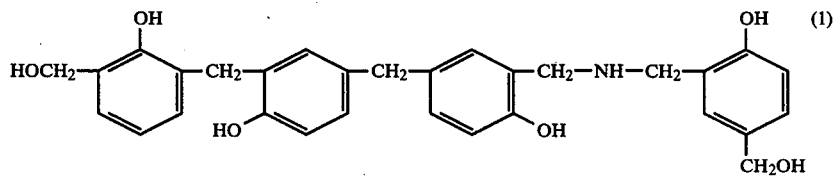

or

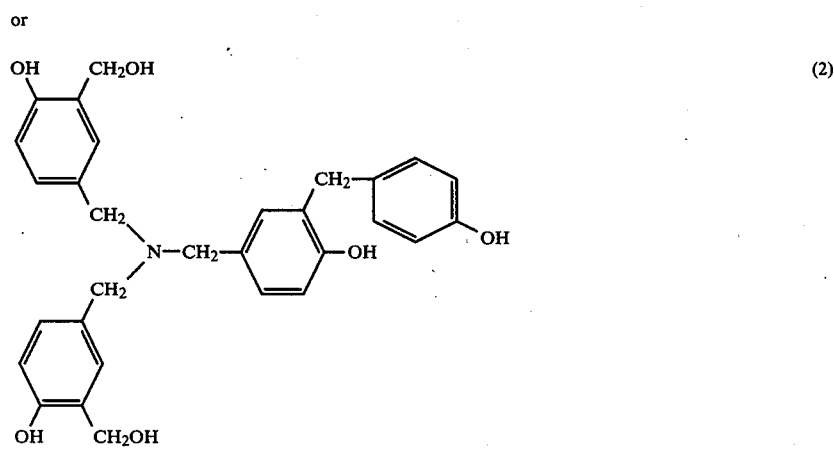

A typical instance of the preparation of the above-mentioned water-insoluble resol type phenolic resin will now be described.

A mixture containing an aldehyde and a phenol at a molar ratio of from 1.0 to 2.5 is charged in a reaction vessel, an alkaline catalyst is added to adjust the pH of the mixture of 7.5 to 9.0, and reaction is carried out at a temperature of 70° to 100° C. for 1 to 4 hours. After completion of the reaction, the reaction mixture is neutralized so that the pH is reduced to 4.0 to 5.0, water is then added and the mixture is sufficiently agitated and allowed to stand.

When the reaction mixture is separated into a resin layer and an aqueous layer, the aqueous layer is removed and the resin layer is collected and dehydrated under reduced pressure by heating. Since gelatination is readily caused in the resin at this step, the temperature should not be allowed to exceed about 140° C. After completion of the dehydration reaction, a solvent is added to the resin from a solvent tank to obtain a resin solution having a desired resin concentration. Ordinarily, the solid content in this resin solution is 30 to 80% by weight.

As the solvent, there can be mentioned, for example, alcohols such as methyl alcohol, ethyl alcohol, butyl alcohol and propyl alcohol, ethers such as ethylene glycol monomethyl ether, ethylene glycol monoethyl ether, ethylene glycol monobutyl ether and isopropyl glycol, ketones such as acetone and methylethyl ketone, esters such as ethyl acetate and butyl acetate, and aromatic solvents such as toluene and xylene. These solvents may be used singly or in the form of a mixture of two or more of them.

Etherification of the above-mentioned resol type phenolic resin with a lower alcohol improves the thermal stability and compatibility with the solvent or the resin used in combination, but diminishes the low-temperature curability and properties of the resulting coating.

Accordingly, etherification is not preferred in the present invention. If etherification is necessary, the degree thereof should be such that less than 30% of the methylol groups are etherified. As the etherifying agent, lower aliphatic alcohols having 1 to 4 carbon atoms are used. The above-mentioned resol type phenolic resin may be mixed or copolycondensed with a modifying agent or a modifying resin according to need. For example, cashew nut shell liquid, rosin, drying oils, polyvinyl acetal, aniline resins, urea resins and melamine resins may be used. Such a modifier is used in an amount of up to about 50 parts by weight per 100 parts by weight of the cationic thermosetting urethane resin as solids.

In the present invention, a magnesium-modified resol type phenolic resin (component BII) may be used instead of the above-mentioned water-insoluble resol type phenolic resin. Using this modified resin prevents coloration caused by formation of a chelate compound in the presence of iron. Moreover, no deterioration in the properties of the resulting coating is observed.

The above-mentioned component BII is a thermosetting resin obtained by modifying with a magnesium compound a water-insoluble resol type phenolic resin synthesized from an aldehyde and a phenol (component BI). A water-insoluble resol type phenolic resin obtained in the presence of an alkaline catalyst is especially preferred as the starting phenolic resin to be modified.

From the viewpoints of the water resistance, corrosion resistance and solvent resistance of the resulting coating, it is preferred that a phenol having a functionality of at least 3 be used as the phenol. A bifunctional phenol may be used in combination with such phenol having a functionality of at least 3.

Phenols, aldehydes and alkaline catalysts described hereinbefore with respect to the synthesis of the component BI can similarly be used for the synthesis of the component BII.

The method used to modify the water-insoluble resol type phenolic resin with a magnesium compound is not particularly critical. For example, a magnesium-modified resol type phenolic resin that is used in the present invention can be obtained by mixing the above-mentioned water-insoluble resol type phenolic resin solution (having a solid content of 30 to 80% by weight) with water in an amount of 1 to 5% by weight based on the resin solids and a magnesium compound in an amount of 5 to 10% by weight based on the resin solids calculated as magnesium, agitating the mixture at a temperature ranging from room temperature to 80° C. for 2 to 10 hours and removing the unreacted magnesium compound by filtration, centrifugal separation or similar means.

Magnesium in the magnesium compound is introduced in the phenolic resin between the methylol group and phenolic hydroxyl group of the phenolic resin by the chelating reaction.

Any magnesium compound capable of a chelating reaction may be used in the present invention, but magnesium oxide, magnesium acetate, magnesium hydroxide and magnesium chloride are preferable.

The so-obtained magnesium-modified resol type phenolic resin may be mixed or copolycondensed with a modifying agent or a modifying resin.

For example, cashew nut shell liquid, rosin, drying oils, polyvinyl acetal, aniline resins, urea resins and melamine resins may be used. Such a modifier is used in an amount of up to about 50 parts by weight per 100 parts by weight of the cationic thermosetting urethane resin as solids.

The so-obtained magnesium-modified resol type phenolic resin is characterized in that coloration due to the chelating reaction with iron can be completely prevented.

The coating composition of the present invention is prepared by mixing the above-mentioned cationic thermosetting urethane resin (component A) with the above-mentioned water-insoluble resol type phenolic resin (component BI) or magnesium-modified resol type phenolic resin (component BII), cationizing the tertiary amine groups in the resin by an acid as a neutralizing agent and diluting the resin mixture with water.

It is preferred that mixing of the component A with the component BI or BII be carried out at a temperature in the range of from room temperature to about 90° C. Care should be taken to avoid gelation.

It is preferred that the component B be used in an amount of 1 to 30% by weight, especially 5 to 20% by weight, based on the total solids of the components A and B.

When the amount of the component B is smaller than 1% by weight based on the total solids of the components A and B, the effects of no improvement in water resistance, moisture resistance, corrosion resistance and low-temperature curability of the coating is attained. On the other hand, when the amount of the component B is larger than 30% by weight based on the total solids of the components A and B, the high flexibility of the coating, which is an inherent property of the urethane resin, is reduced, physical properties of the coating tend to deteriorate, and a stable aqueous dispersion cannot readily be obtained.

As the acid for neutralizing the tertiary amino groups, there are used organic acids such as formic acid, acetic acid, propionic acid, lactic acid and citric acid.

The tertiary amino groups may be quaternarized according to known methods, if desired.

The amount of the acid used as the neutralizing agent is less than one mole per mole of the tertiary amino groups in the resin.

The so-obtained coating composition of the present invention can be used in the form of an aqueous dispersion in various fields according to various coating methods. Since various solvents are used in the step of forming the cationic urethane resin, the coating composition of the present invention may contain such organic solvents to some extent. However, the total amount of these solvents should be smaller than 20% by weight based on the sum of the organic solvents and water in the coating composition.

The aqueous thermosetting resin coating composition of the present invention may be formed into an enamel by incorporating a coloring pigment, an extender pigment, an anti-corrosive pigment, a curing promotor, a surface adjusting agent, a defoaming agent and the like into the coating composition of the present invention and grinding the mixture according to a known grinding method.

The coating composition of the present invention is suitably used for electrodeposition coating, but may conveniently be applied to other coating methods such as air-spray coating, dip coating and brush coating. The coating composition of the present invention is of the thermosetting type, and the baking conditions are determined according to the kind and amount of the blocking agent, the presence or absence of the curing promotor, as well as the amount and kind of the curing promotor and phenolic resin. Ordinarily, however, the baking operation is carried out at a temperature of 90° to 200° C. for 10 to 60 minutes.

The coating composition of the present invention is highly cross-linked by such baking operation to provide a coating which is excellent in corrosion resistance, water resistance, moisture resistance, solvent resistance and physical properties.

The present invention will now be described in detail with reference to the following Examples that by no means limit the scope of the invention. In these Examples, "parts" and "%" are by weight unless otherwise indicated.

EXAMPLES 1 through 4

[Synthesis of Cationic Urethane Resin]

At 60° C., 87 parts of a mixture comprising 80% of 2,4-tolylene diisocyanate and 20% of 2,6-tolylene diisocyanate was agitated, and a solution of 100 parts of polypropylene glycol (having a molecular weight of 400) in 100 parts of acetone was gradually added dropwise to the mixture. After completion of the dropwise addition, reaction was carried out at 60° C. for 3 hours, the temperature was lowered to 40° C., and a liquid mixture comprising 75 parts of triethanol amine and 40 parts of acetone was gradually added dropwise to the reaction mixture. Reaction was conducted at 50° to 60° C. for 2 hours to obtain a reaction product (a).

Separately, 87 parts of a mixture comprising 80% of 2,4-tolylene diisocyanate and 20% of 2,6-tolylene diisocyanate was agitated at 60° C. and a solution of 65 parts of 2-ethylhexanol in 65 parts of acetone was gradually added dropwise to the mixture being agitated. Reaction was carried out at 60° C. for 3 hours to obtain an addition reaction product (b).

The addition reaction product (b) was gradually added dropwise to the reaction product (a), and reaction was carried out at 40° C. for 2 hours and at 50° C. for 1 hour.

The acetone in the resulting composition was solvent-substituted by ethylene glycol monoethyl ether to obtain a cationic thermosetting urethane resin (1) having a solid content of 70%.

[Synthesis of Water-Insoluble Resol Type Phenolic Resin]

Charged in a reaction vessel equipped with a reflux cooler, a pressure-reducing device and a stirrer, were 94 parts of carbolic acid, 162 parts of formaline (37% aqueous solution) and 13 parts of 28% aqueous ammonia. The temperature was elevated and the reaction carried out for 2 hours under reflux.

After completion of the reaction, 200 parts of deionized water was added to the reaction mixture and the resulting mixture was stirred and allowed to stand overnight. The aqueous layer was separated and removed. The remaining resin layer was heated (below 100° C.) under reduced pressure to effect dehydration. The residual resin was dissolved in methanol so that the solid content was 50%, thus providing a water-insoluble resol type phenolic resin solution (1).

It should be noted that the formalin/carbolic acid molar ratio was 2.0.

[Preparation of Coating Composition]

The above-mentioned urethane resin (1), the water-insoluble resol type phenolic resin (1), lactic acid and dibutyltin oxide were sufficiently mixed at a mixing ratio shown in Table 1, and, while being stirred, the mixture was gradually diluted with deionized water to adjust the solid content to about 16%, giving an aqueous thermosetting coating composition for electrodeposition according to the present invention.

[Preparation of Test Samples]

While the above-mentioned coating composition for electrodeposition was being stirred, a zinc phosphate-treated steel plate (0.8 mm×70 mm×150 mm) was subjected to electrodeposition in this coating composition at 25° to 30° C. for 3 minutes, the coated plate was washed with deionized water, and the coating was dried and baked at 180° C. for 20 minutes. The voltage was adjusted so that the thickness of the coating after the baking treatment was 20μ. The electrodeposition apparatus used comprised a rectifier of 0 to 500 V, a box-shaped electrodeposition tank of polyvinyl chloride having a capacity of about 3.5 liters, a magnetic stirrer and carbon electrode plates (5 mm×70 mm×150 mm; electrode spacing=about 10 cm).

Properties of the coating composition for electrodeposition and the baked coating are shown in Table 1.

EXAMPLE 5

[Synthesis of Water-Insoluble Resol Type Phenolic Resin]

Charged in a reaction vessel equipped with a reflux cooler, a pressure-reducing device and a stirrer, were 94 parts of carbolic acid, 122 parts of formalin (37% aqueous solution) and 9 parts of 28% aqueous ammonia. The temperature was elevated and the reaction carried out under reflux for 1.5 hours.

After completion of the reaction, 200 parts of deionized water was added to the reaction mixture and the resulting mixture was sufficiently agitated and allowed to stand overnight. The aqueous layer was separated and removed, and the remaining resin layer was heated (to below 100° C.) under reduced pressure to effect dehydration. The residual resin was dissolved in isopropyl alcohol to adjust the solid content to 50%, thus providing a water-insoluble resol type phenolic resin solution (2).

The formalin/carbolic acid molar ratio was 1.5.

[Preparation of Coating Composition]

The urethane resin (1) prepared in Example 1, the water-insoluble resol type phenolic resin (2), lactic acid and dibutyltin oxide were sufficiently mixed at a ratio shown in Table 1 and, while being stirred, the mixture was gradually diluted with deionized water to adjust the solid content to about 16%, giving an aqueous thermosetting coating composition for electrodeposition according to the present invention.

[Preparation of Test Samples]

Test samples were prepared in the same manner as described in Example 1. Properties of the coating composition for electrodeposition and the baked coating are shown in Table 1.

EXAMPLE 6

[Synthesis of Water-Insoluble Resol Type Phenolic Resin]

Charged in a reaction vessel equipped with a reflux cooler, a pressure-reducing device and a stirrer, were 108 parts of m-cresol, 162 parts of formalin (37% aqueous solution) and 13 parts of 28% aqueous ammonia. The temperature was elevated and the reaction carried out under reflux for 2 hours.

After completion of the reaction, 200 parts of deionized water was added to the reaction mixture, and the resulting mixture was sufficiently agitated and allowed to stand overnight. The aqueous layer was separated and removed, and the remaining resin layer was heated (to below 100° C.) under reduced pressure to effect dehydration. The residual resin was dissolved in methanol to adjust the solid content to 50%, thus providing a water-insoluble resol type phenolic resin solution (3).

The formalin/m-cresol molar ratio was 2.0.

[Preparation of Coating Composition]

The urethane resin (1) prepared in Example 1, the water-insoluble resol type phenolic resin (3), lactic acid and dibutyltin oxide were sufficiently mixed at a ratio shown in Table 1, and, while being stirred, the mixture was gradually diluted with deionized water to adjust the solid content to about 16%, giving an aqueous thermosetting coating composition for electrodeposition according to the present invention.

[Preparation of Test Samples]

Test samples were prepared in the same manner as described in Example 1. Properties of the coating composition and the baked coating are shown in Table 1.

EXAMPLE 7

[Synthesis of Water-Insoluble Resol Type Phenolic Resin]

Charged in a reaction vessel equipped with a reflux cooler, a pressure-reducing device and a stirrer, were 94 parts of carbolic acid, 122 parts of formalin (37% aqueous solution) and 7 parts of methylamine. The temperature was elevated and the reaction carried out under reflux for 1.5 hours.

After completion of the reaction, 200 parts of deionized water was added to the reaction mixture and the resulting mixture was sufficiently agitated and allowed to stand overnight. The aqueous layer was separated and removed, and the remaining resin layer was heated (to below 100° C.) under reduced water to effect dehydration. The residual resin was dissolved in isopropyl alcohol to adjust the solid content to 50%, thus providing a water-insoluble resol type phenolic resin solution (4).

The formalin/carbolic acid molar ratio was 1.5.

[Preparation of coating Composition]

The urethane resin (1) prepared in Example 1, the water-insoluble resol type phenolic resin (4), lactic acid and dibutyltin oxide were sufficiently mixed at a ratio shown in Table 1. The mixture, while being stirred was gradually diluted with deionized water to adjust the solid content to about 16%, giving an aqueous thermosetting coating composition for electrodeposition according to the present invention.

[Preparation of Test Samples]

Test samples were prepared in the same manner as described in Example 1. Properties of the coating composition and the baked coating are shown in Table 1.

EXAMPLE 8

[Synthesis of Water-Insoluble Resol Type Phenolic Resin]

Charged in a reaction vessel equipped with a reflux cooler, a pressure-reducing device and a stirrer, were 94 parts of carbolic acid, 122 parts of formalin (37% aqueous solution) and 15 parts of sodium hydroxide (10% aqueous solution). The temperature was elevated and the reaction carried out under reflux for 1.5 hours. Acetic acid was added to the reaction mixture to adjust the pH to 4 to 5.

After completion of the reaction, 200 parts of deionized water was added to the reaction mixture and the resulting mixture was sufficiently agitated and allowed to stand overnight. The aqueous layer was separated and removed, and the remaining resin layer was heated (to below 100° C.) under reduced pressure to effect dehydration. The residual resin was dissolved in isopropyl alcohol to adjust the solid content to 50%, thus providing, a water-insoluble resol type phenolic resin solution (5).

The formalin/carbolic acid molar ratio was 1.5.

[Preparation of Coating Composition]

The urethane resin (1) prepared in Example 1, the water-insoluble resol type phenolic resin (5), lactic acid and dibutyltin oxide were sufficiently mixed at a ratio shown in Table 1, and, while being stirred, the mixture was gradually diluted with deionized water to adjust the solid content to about 16%, giving an aqueous thermosetting coating composition for electrodeposition according to the present invention.

[Preparation of Test Samples]

Test samples were prepared in the same manner as described in Example 1. Properties of the coating composition and the baked coating are shown in Table 1.

justed so that the thickness of the baked coating was 20μ.

The same electrodeposition apparatus as used in Example 1 was used in this Example.

Properties of the electrodeposition paint and the baked coating are shown in Table 2.

TABLE 1

Compositions of Paints and Results of Comparative Tests of Properties of Coatings

| | Example 1 | Example 2 | Example 3 | Example 4 | Example 5 | Example 6 | Example 7 | Example 8 |
|---|---|---|---|---|---|---|---|---|
| Paint Composition (parts)[1] | | | | | | | | |
| Urethane resin (1) | 97.5 | 95 | 90 | 80 | 90 | 90 | 90 | 90 |
| Resol type phenolic resin (1) | 2.5 | 5 | 10 | 20 | | | | |
| Resol type phenolic resin (2) | | | | | 10 | | | |
| Resol type phenolic resin (3) | | | | | | 10 | | |
| Resol type phenolic resin (4) | | | | | | | 10 | |
| Resol type phenolic resin (5) | | | | | | | | 10 |
| Dibutyltin oxide | 0.98 | 0.95 | 0.9 | 0.8 | 0.9 | 0.9 | 0.9 | 0.9 |
| Lactic acid | 6.83 | 6.65 | 6.3 | 5.6 | 6.3 | 6.3 | 6.3 | 6.3 |
| Properties of Paints | | | | | | | | |
| Solid content (%) | 16.0 | 16.0 | 16.1 | 15.9 | 16.1 | 15.8 | 16.0 | 16.2 |
| pH | 5.8 | 5.9 | 5.9 | 5.9 | 5.8 | 5.8 | 5.8 | 6.0 |
| Specific resistance (Ω-cm) | 690 | 740 | 760 | 780 | 750 | 770 | 740 | 760 |
| Storage stability | o | o | o | o | o | o | o | o |
| Properties of Coatings | | | | | | | | |
| Hardness[3] | 2H | 2H | 2H | 2H | 2H | 2H | 2H | 2H |
| Impact resistance (cm)[4] | 50< | 50< | 50< | 45 | 50< | 50< | 50< | 50 |
| Adhesiveness[5] | 100/100 | 100/100 | 100/100 | 100/100 | 100/100 | 100/100 | 100/100 | 100/100 |
| Moisture resistance[6] | | | | | | | | |
| 48 hours | 100/100 | 100/100 | 100/100 | 100/100 | 100/100 | 100/100 | 100/100 | 100/100 |
| 72 hours | 80/100 | 100/100 | 100/100 | 100/100 | 100/100 | 100/100 | 100/100 | 95/100 |
| Salt spray resistance[7] | | | | | | | | |
| 200 hours | o | o | o | o | o | o | o | o |
| 500 hours | 1-3 | o | o | o | o | o | o | o |
| Solvent resistance[8] | o | o | o | o | o | o | o | o |
| Alkali resistance[9] | o | o | o | o | o | o | o | o |

Note
[1]The amount of each resin was that of the solids.
[2]The sample paint was allowed to stand at room temperature for 1 month and was re-dispersed, and the storage stability was evaluated accoridng to the state of re-dispersion as follows:
o : easily re-dispersed
Δ : re-dispersible
x : hardly re-dispersed
[3]Pencil hardness
[4]Du Pont type impact tester (impinging pin radius = 0.25", falling weight = 1 Kg).
[5]An adhesive cellophane tape was applied to the cross-cut sample (cut in 1 mm squares) and then peeled off.
[6]The adhesive test was performed after the sample had been allowed to stand at a temperature of 70° C. and a relative humidity higher than 97% for a predetermined time.
[7]The salt spray resistance was tested according to the method of JIS Z2371 [evaluated based on the peel width (mm) of the adhesive collophane tape in the cut portion].
[8]Acetone rubbing was conducted 10 times and the solvent resistance was evaluated according to the state of the sample as follows:
o : not changed
Δ : partially dissolved
x : dissolved
[9]The sample was immersed in a 0.1N aqueous solution of NaOH at room temperature for 24 hours, and the alkali resistance was evaluated according to the following scale:
o : no change in appearance
Δ : slight blistering or other defects
x : blistering, blushing and other defects

COMPARATIVE EXAMPLE 1

[Preparation of Coating Composition]

The urethane resin (1) prepared in Example 1, lactic acid and dibutyltin oxide were sufficiently mixed at a ratio shown in Table 2, and, while being stirred, the mixture was gradually diluted with deionized water to adjust the solid content to about 16%, giving an electrodeposition paint free of a water-insoluble resol type phenolic resin.

[Preparation of Test Samples]

While the electrodeposition paint was being stirred, a zinc phosphate-treated steel plate (0.8 mm×70 mm×150 mm) was subjected to electrodeposition of the paint at 25° to 30° C. for 3 minutes. The coated plate was washed with deionized water and the coating was baked at 180° C. for 20 minutes. The voltage was ad-

COMPARATIVE EXAMPLE 2

[Synthesis of Water-soluble Resol Type Phenolic Resin]

Charged in a reaction vessel equipped with a reflux cooler, a pressure-reducing device and a stirrer, were 94 parts of carbolic acid, 162 parts of formalin (37% aqueous solution) and 30 parts of sodium hydroxide (10% aqueous solution). The temperature was elevated and the reaction carried out at 60° C. for 7 hours. Acetic acid was added to neutralize the reaction mixture and adjust the pH to 4 to 5 and dehydration was carried out under reduced pressure. The obtained resin was heated and, while being stirred, deionized water was gradually added to the resin to adjust the solid content to 50%, thus providing a water-soluble resol type phenolic resin (6) (the formalin/carbolic acid molar ratio was 2.0).

[Preparation of Coating Composition]

The urethane resin (1) prepared in Example 1, the water-soluble resol type phenolic resin (6), lactic acid and dibutyltin oxide were sufficiently mixed at a ratio shown in Table 2, and, while being stirred, the mixture was gradually agitated with deionized water to adjust the solid content to about 16%, thus giving an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 3

[Preparation of Coating Composition]

The urethane resin (1) prepared in Example 1, a water-insoluble resol type phenolic resin (7) formed by etherifying the water-insoluble resol type phenolic resin (1) used in Example 1 with n-butyl alcohol, lactic acid and dibutyltin oxide were sufficiently mixed at a ratio shown in Table 2, and, while being stirred, the mixture was gradually diluted with deionized water to adjust the solid content to about 16%, thus providing an electrodeposition paint.

[Preparation of Test Samples]

Test samples were prepared in the same manner as described in Comparative Example 1. Properties of the electroposition paint and the baked coating are shown in Table 2.

COMPARATIVE EXAMPLE 4

[Synthesis of Cationic Epoxy Resin]

In a solution of 90 parts of an epoxy resin synthesized from bisphenol A and epichlorohydrin [manufactured and sold under the tradename "Epikote 1001" by Shell Chemicals; epoxy equivalent=450–500] in 100 parts of dioxane, 30 parts of triethanol amine was gradually added dropwise, and the reaction was carried out at 85° C. for 2 hours. Then, the temperature was elevated to 95° C. and the reaction was further conducted for 3 hours to obtain a product (I).

Separately, while 26 parts of a mixture of 80% of 2,4-tolylene diisocyanate and 20% of 2,6-tolylene diisocyanate was being stirred at 60° C., a liquid mixture of 19.5 parts of 2-ethylhexanol and 19.5 parts of acetone was gradually added dropwise to the above mixture, and reaction was carried out at 55° to 60° C. for 3 hours to obtain a product (II).

The product (II) was gradually added dropwise to the product (I) at room temperature, and the reaction was carried out at 40° C. for 2 hours and at 50° C. for 1 hour. The dioxane and acetone in the reaction mixture were solvent-substituted by ethylene glycol monoethyl ether and the solid content was adjusted to 70% to obtain a cationic thermosetting epoxy resin (1).

[Preparation of Coating Composition]

The above-mentioned cationic epoxy resin (1), the water-soluble resol type phenolic resin (6) prepared in Comparative Example 2, lactic acid and dibutyltin oxide were sufficiently mixed at a ratio shown in Table 2. The mixture, while being stirred, was gradually diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 5

[Preparation of Coating Composition]

The cationic epoxy resin (1) prepared in Comparative Example 4, the water-insoluble resol type phenolic resin (7) prepared in Comparative Example 3, lactic acid and dibutyltin oxide were sufficiently mixed at a ratio shown in Table 2. The mixture, while being stirred, was gradually diluted with deionized water to adjust the solid content to about 16%, thus giving an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 6

[Preparation of Coating Composition]

The cationic epoxy resin (1) prepared in Comparative Example 4, the water-insoluble resol type phenolic resin (1) used in Example 1, lactic acid and dibutyltin oxide were sufficiently mixed, and, while being stirred, the mixture was diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 7

[Synthesis of Cationic Acrylic Resin]

A mixture comprising 10 parts of dimethylaminoethyl methacrylate, 5 parts of acrylamide, 40 parts of n-butyl acrylate, 35 parts of t-butyl acrylate, 10 parts of 2-hydroxyethyl methacrylate and 2 parts of azobisisobutyronitrile was added dropwise to 45 parts of ethylene glycol monoethyl ether under agitation over a period of 2 hours. When 1 hour had passed from the point of completion of the dropwise addition, 0.5 part of azobisisobutyronitrile was further added to the mixture, and the reaction mixture was maintained at 80° C. for 4 hours to obtain a cationic acrylic resin (1) having a solid content of about 70%.

[Preparation of Coating Composition]

The cationic acrylic resin (1), the water-soluble resol type phenolic resin (6) used in Comparative Example 2 and lactic acid were sufficiently mixed at a ratio shown in Table 2, and, while being stirred, the mixture was gradually diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 8

[Preparation of Coating Composition]

The cationic acrylic resin (1) prepared in Comparative Example 7, the n-butyl alcohol-etherified water-insoluble resol type phenolic resin (7) used in Comparative Example 3 and lactic acid were sufficiently mixed at a ratio shown in Table 2. The mixture, while being stirred, was gradually diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 9

[Preparation of Coating Composition]

The cationic acrylic resin (1) prepared in Comparative Example 7, the water-insoluble resol type phenolic resin (1) used in Example 1 and lactic acid were sufficiently mixed, and, while being stirred, the mixture was gradually diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

Comparative Example 10

[Preparation of Coating Composition]

The urethane resin (1) prepared in Example 1, the water-insoluble resol type phenolic resin (1) prepared in Example 1, a polybutadiene resin (1) ("Nisseki Polybutadiene B-2000" manufactured and sold by Nippon Sekiyu Kagaku K. K.), lactic acid and dibutyltin oxide were sufficiently mixed at a ratio shown in Table 2. The mixture, while being stirred, was gradually diluted with deionized water to adjust the solid content to about 16%, thus providing, an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 11

[Preparation of Coating Composition]

The urethane resin (1) prepared in Example 1, the water-insoluble resol type phenolic resin (1) prepared in Example 1, a polybutadiene resin (2) ("Nisso-PBB-3000" manufactured and sold by Nippon Soda K. K.), lactic acid and dibutyltin oxide were sufficiently mixed at a ratio indicated in Table 2. The mixture, while being stirred, was diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

COMPARATIVE EXAMPLE 12

[Preparation of Coating Composition]

The urethane resin (1) prepared in Example 1, a water-soluble melamine resin (1) ("Cymel 1116" manufactured and sold by American Cyanamide Co.) and lactic acid were sufficiently mixed at a ratio shown in Table 2, and while being stirred, the mixture was gradually diluted with deionized water to adjust the solid content to about 16%, thus providing an electrodeposition paint.

[Preparation of Test Samples]

Test samples were prepared in the same manner as described in Comparative Example 1. Properties of the electrodeposition paint and the baked coating are shown in Table 2.

TABLE 2

Compositions of Paints and Results of Comparative Tests of Properties of Coatings

| | Comparative Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Paint Composition (parts) | | | | | | | | | | | | |
| Urethane resin (1) | 100 | | | | | | | | | | | |
| Epoxy resin (1) | | 90 | 90 | | | | | | | | | |
| Acrylic resin (1) | | | | 90 | 90 | 90 | | | | | | |
| Resol type phenolic resin (1) | | | | | | | 90 | 90 | 90 | | | |
| Resol type phenolic resin (6) | | 10 | | 10 | | 10 | 10 | | | | | |
| Resol type phenolic resin (7) | | | | | | | | 10 | | | | |
| Polybutadiene resin (1) | | | | | | | | | | 40 | 40 | 90 |
| Polybutadiene resin (2) | | | | | | | | | | 10 | 10 | |
| Melamine resin (1) | 1 | | | | | | | | | | | |
| Dibutyltin oxide | .7 | | | | | | | | | | | |
| Lactic acid | | 0.9 | 0.9 | 0.9 | 0.9 | 0.9 | | | | | | |
| | | 6.3 | 6.3 | 8 | 8 | 8 | | | | | | |
| Properties of Paints | | | | | | | | | | | | |
| Solid content (%) | 16.1 | 16.0 | 16.2 | 15.9 | 15.8 | 16.2 | 16.0 | 15.8 | 15.9 | 16.1 | 16.0 | 16.0 |
| pH | 5.8 | 5.8 | 5.7 | 5.5 | 5.6 | 5.6 | 6.1 | 6.2 | 6.1 | 5.8 | 5.9 | 5.8 |
| Specific Resistance (Ω-cm) | 655 | 770 | 720 | 665 | 670 | 660 | 945 | 910 | 910 | 730 | 735 | 730 |
| Storage stability | 0 | Δ-0 | 0 | Δ-0 | 0 | 0 | Δ | Δ | Δ | × | × | 0 |
| Properties of Coatings | | | | | | | | | | | | |
| Hardness | 2H | 2H | 2H | 3H | 3H | 3H | HB | HB | HB | B> | B> | 2H |
| Impact resistance (cm) | 50< | 50< | 50< | 30 | 30 | 25 | 40 | 40 | 40 | 20 | 20 | 50< |
| Adhesiveness | 100/100 | 100/100 | 100/100 | 100/100 | 100/100 | 100/100 | 100/100 | 100/100 | 100/100 | 100/100 | 100/100 | 100/100 |
| Moisture resistance | | | | | | | | | | | | |
| 48 hours | 100/100 | 80/100 | 70/100 | 100/100 | 100/100 | 100/100 | 75/100 | 70/100 | 80/100 | 80/100 blushing | 75/100 blushing | 100/100 |
| 72 hours | 0/100 | 0/100 | 0/100 | 70/100 | 80/100 | 100/100 | 0/100 | 0/100 | 30/100 | 80/100 blushing | 70/100 blushing | 80/100 |
| Salt spray resistance | | | | | | | | | | | | |
| 200 hours | 3-5 | 5-6 | 4-6 | 1-3 | 1-2 | 0 | 5-8 | 4-7 | 2-5 | 4-8 | 5-8 | 3-5 spot rusts |
| 500 hours | 10< | 10< | 10< | 2-5 | 3-6 | 0 | 10< | 10< | 10< | 10< | 10< | 10< spot rusts |
| Solvent resistance | 0 | 0 | 0 | 0 | 0 | 0 | Δ | Δ | Δ | × | × | 0 |
| Alkali resistance | 0 | 0 | 0 | 0 | 0 | 0 | Δ | Δ | Δ | × | × | 0 |

Note
(1)The amount of each resin was that of the solids.
(2)The test methods and conditions were the same as described hereinbefore with respect to Table 1.

EXAMPLES 9 THROUGH 12

[Synthesis of Magnesium-Modified Resol Type Phenolic Resin]

Charged in a reaction vessel equipped with a reflux cooler, a pressure-reducing device and a stirrer, were 94 parts of carbolic acid, 162 parts of formalin (37% aqueous solution) and 13 parts of 28% aqueous ammonia. The temperature was elevated and the reaction carried out under reflux for 2 hours.

After completion of the reaction, 200 parts of deionized water was added to the reaction mixture, and the resulting mixture was sufficiently agitated and allowed to stand overnight. The aqueous layer was separated and removed, and the remaining resin layer was heated (to below 100° C.) under reduced pressure to effect dehydration. The residual resin was dissolved in methanol to adjust the solid content to 50%. Then, 3 parts of deionized water and 15 parts of magnesium oxide were added to the solution and the mixture was stirred at 30° C. for 6 hours. The unreacted magnesium oxide was removed by a centrifugal separator to obtain a magnesium-modified resol type phenolic resin solution (1).

The fomalin/carbolic acid molar ratio was 2.0.

[Preparation of Coating Composition]

The urethane resin (1) prepared in Example 1, the above magnesium-modified resol type phenolic resin (1), lactic acid and dibutyltin oxide were sufficiently mixed at a ratio shown in Table 3, and, while being stirred, the mixture was gradually diluted with deionized water to adjust the solid content to about 16%, thus providing an aqueous thermosetting coating composition for electrodeposition according to the present invention.

[Preparation of Test Samples]

Test samples were prepared in the same manner as described in Example 1. Properties of the electrodeposition paint and the baked coating are shown in Table 3.

EXAMPLE 13

[Synthesis of Magnesium-Modified Resol Type Phenolic Resin]

Charged in a reaction vessel equipped with a reflux cooler, a pressure-reducing device and a stirrer, were 94 parts of carbolic acid, 122 parts of formalin (37% aqueous solution) and 9 parts of 28% aqueous ammonia. The temperature was elevated and the reaction carried out under reflux for 1.5 hours.

After completion of the reaction, 200 parts of deionized water was added to the reaction mixture, and the mixture was sufficiently agitated and allowed to stand overnight. The aqueous layer was separated and removed, and the remaining resin layer was heated (to below 100° C.) under reduced pressure to effect dehydration. The residual resin was dissolved in isopropyl alcohol to adjust the solid content to 50%. Then, 3 parts of deionized water and 15 parts of magnesium oxide were added to the solution, and the mixture was stirred at 30° C. for 6 hours. The unreacted magnesium oxide was removed by a centrifugal separator to obtain a magnesium-modified resol type phenolic resin solution (2).

The formalin/carbolic acid molar ratio was 1.5.

[Preparation of Coating Composition]

The urethane resin (1) prepared in Example 1, the above magnesium-modified resol type phenolic resin (2), lactic acid and dibutyltin oxide were sufficiently mixed at a ratio shown in Table 3, and, while being stirred, the mixture was gradually diluted with deionized water to adjust the solid content to about 16%, thus providing an aqueous thermosetting coating composition for electrodeposition according to the present invention.

[Preparation of Test Samples]

Test samples were prepared in the same manner as described in Example 1. Properties of the electrodeposition paint and the baked coating are shown in Table 3.

EXAMPLE 14

[Synthesis of Magnesium-Modified Resol Type Phenolic Resin ]

Charged in a reaction vessel equipped with a reflux cooler, a pressure-reducing device and a stirrer, were 108 parts of m-cresol, 162 parts of formalin (37% aqueous solution) and 13 parts of 28% aqueous ammonia. The temperature was elevated and the reaction carried out under reflux for 2 hours.

After completion of the reaction, 200 parts of deionized water was added to the reaction mixture, and the mixture was sufficiently agitated and allowed to stand overnight. The aqueous layer was separated and removed, and the residual resin layer was heated (to below 100° C.) under reduced pressure to effect dehydration. The residual resin was dissolved in methanol to adjust the solid content to 50%. Then, 3 parts of deionized water and 15 parts of magnesium oxide were added to the solution and the mixture was stirred at 30° C. for 6 hours. The unreacted magnesium oxide was removed by a centrifugal separator to obtain a magnesium-modified resol type phenolic resin solution (3).

The formalin/m-cresol molar ratio was 2.0.

[Preparation of Coating Composition]

The urethane resin (1) prepared in Example 1, the above magnesium-modified resol type phenolic resin (3), lactic acid and dibutyltin oxide were mixed at a ratio shown in Table 3, and while being stirred, the mixture was gradually diluted with deionized water to adjust the solid content to about 16%, thus providing an aqueous thermosetting coating composition for electrodecomposition according to the present invention.

[Preparation of Test Samples]

Test samples were prepared in the same manner as described in Example 1. Properties of the electrodeposition paint and the baked coating are shown in Table 3.

EXAMPLE 15

[Synthesis of Magnesium-Modified Resol Type Phenolic Resin]

Charged in a reaction vessel equipped with a reflux cooler, a pressure-reducing device and a stirrer, were 94 parts of carbolic acid, 122 parts of formalin (37% aqueous solution) and 7 parts of methylamine. The temperature was elevated and the reaction carried out under reflux for 1.5 hours.

After completion of the reaction, 200 parts of deionized water was added to the reaction mixture, and the mixture was sufficiently agitated and allowed to stand overnight. The aqueous layer was separated and removed, and the remaining resin layer was heated (to below 100° C.) under reduced pressure to effect dehydration. The residual resin was dissolved in isopropyl alcohol to adjust the solid content to 50%. Then, 80 parts of magnesium acetate [Mg(CH$_3$COO)$_2$4H$_2$O] and 3 parts of deionized water were added to the solution, and the mixture was stirred at 30° C. for 6 hours. The unreacted magnesium acetate was removed by a centrifugal separator to obtain a magnesium-modified resol type phenolic resin solution (4).

The formalin/carbolic acid molar ratio was 1.5.

[Preparation of Coating Composition]

The urethane resin (1) prepared in Example 1, the above magnesium-modified resol type phenolic resin (4), lactic acid and dibutyltin oxide were sufficiently mixed at a ratio shown in Table 3, and, while being stirred, the mixture was gradually diluted with deionized water to adjust the solid content to about 16%, thus providing an aqueous thermosetting coating composition for electrodeposition according to the present invention.

[Preparation of Test Samples]

Test samples were prepared in the same manner as described in Example 1. Properties of the electrodeposition paint and the baked coating were shown in Table 3.

What is claimed is:

1. An aqueous thermosetting resin coating composition comprising (A) a cationic thermosetting urethane resin, (B) a water-insoluble resol type phenolic resin, (C) an acid as a neutralizing agent and (D) water as a diluent, wherein the cationic thermosetting urethane resin (A) is a thermosetting resin formed by reaction between hydroxyl groups in a reaction product of a polyurethane prepolymer having a terminal isocyanate group with a tertiary amine having at least 2 hydroxyl groups in the molecule and isocyanate groups in a reaction product of equimolar amounts of an organic diisocyanate and a monofunctional blocking agent, the water-insoluble resol type phenolic resin (B) is a thermosetting resin formed by reacting an aldehyde with a phenol at an aldehyde/phenol molar ratio of from 1.0 to 2.5 in the presence of an alkaline catalyst and the mixing weight ratio (based on the solids) of the cationic thermosetting urethane resin (A) to the water-insoluble resol type phenolic resin (B) is in the range of from 99/1 to 70.30.

2. An aqueous thermosetting resin coating composition as set forth in claim 1 wherein the water-insoluble resol type phenolic resin (B) is a thermosetting resin formed by reacting an aldehyde with a phenol at an aldehyde/phenol molar ratio of from 1.0 to 2.5 in the presence of a catalyst selected from the group consisting of ammonia, primary amines, secondary amines and metal hydroxides.

3. An aqueous thermosetting resin coating composi-

TABLE 3

Compositions of Paints and Results of Comparative Tests of Properties of Coating

| | Example 9 | Example 10 | Example 11 | Example 12 | Example 13 | Example 14 | Example 15 |
|---|---|---|---|---|---|---|---|
| Paint Composition (parts)[1] | | | | | | | |
| Urethane resin (1) | 95.0 | 92.5 | 90 | 85 | 90 | 90 | 90 |
| Magnesium-modified resol type phenol resin (1) | 5 | 7.5 | 10 | 15 | | | |
| Magnesium-modified resol type phenol resin (2) | | | | | | | |
| Magnesium-modified resol type phenolic resin (3) | | | | | | 10 | |
| Magnesium-modified resol type phenol resin (4) | | | | | | | 10 |
| Diputyltin oxide | 0.95 | 0.93 | 0.9 | 0.85 | 0.9 | 0.9 | 0.9 |
| Lactic acid | 5.7 | 5.6 | 5.4 | 5.1 | 5.4 | 5.4 | 5.4 |
| Properties of Paints | | | | | | | |
| Solid content (%) | 16.1 | 16.0 | 16.2 | 15.9 | 16.0 | 15.9 | 16.1 |
| pH | 6.1 | 6.1 | 6.1 | 6.0 | 6.1 | 6.1 | 6.0 |
| Specific resistance (Ω-cm) | 730 | 800 | 800 | 825 | 810 | 820 | 785 |
| Staining of iron[2] | o | o | o | o | o | o | o |
| Storage stability | o | o | o | o | o | o | o |
| Properties of Coatings | | | | | | | |
| Hardness | 2H | 2H | 2H | 2H | 2H | 2H | 2H |
| Impact resistance (cm) | 50< | 50< | 50< | 50< | 50< | 50< | 50< |
| Adhesiveness | 100/100 | 100/100 | 100/100 | 100/100 | 100/100 | 100/100 | 100/100 |
| Moisture resistance | | | | | | | |
| 48 hours | 100/100 | 100/100 | 100/100 | 100/100 | 100/100 | 100/100 | 100/100 |
| 72 hours | 100/100 | 100/100 | 100/100 | 100/100 | 100/100 | 100/100 | 100/100 |
| Salt spray resistance | | | | | | | |
| 200 hours | o | o | o | o | o | o | o |
| 500 hours | o | o | o | o | o | o | o |
| Solvent resistance | o | o | o | o | o | o | o |
| Alkali resistance | o | o | o | o | o | o | o |

Note
[1]The amount of each resin was that of the solids.
[2]A soft steel plate (10 cm$^2$) was immersed in 100 g of the coating composition at room temperture for 3 days and the staining of iron was evluated based on the degree of coloration of the composition according to the following scale:
o : no change
x : extreme coloration Other properties were tested under the same conditions according to the same methods as described hereinbefore with respect to Table 1.

tion as set forth in claim 1 wherein the water-insoluble resol type phenolic resin (B) is a magnesium-modified resol type phenolic resin.

4. An aqueous thermosetting resin coating composition as set forth in claim 3 wherein the magnesium-modified resol type phenolic resin (B) is a modified thermosetting resin formed by reacting an aldehyde with a phenol at an aldehyde/phenol molar ratio of from 1.0 to 2.5 in the presence of an alkaline catalyst and chelating the resulting reaction product with a magnesium compound.

5. An aqueous thermosetting resin coating composition as set forth in claim 3 wherein the mixing weight ratio (based on the solids) of the cationic thermosetting urethane resin (A) to the magnesium-modified resol type phenolic resin (B) is in the range of from 99/1 to 70/30.

6. An aqueous thermosetting resin coating composition as set forth in claim 3 wherein the magnesium-modified resol type phenolic resin (B) is a modified thermosetting resin formed by reacting an aldehyde with a phenol at an aldehyde/phenol molar ratio of from 1.0 to 2.5 in the presence of a catalyst selected from the group consisting of ammonia, primary amines, secondary amines and metal hydroxides and chelating the resulting reaction product with a magnesium compound.

7. An aqueous thermosetting resin coating composition as set forth in claim 3 wherein the magnesium is magnesium oxide, magnesium acetate, magnesium hydroxide or magnesium chloride.

* * * * *